(12) United States Patent
McWaters et al.

(10) Patent No.: US 10,112,722 B2
(45) Date of Patent: Oct. 30, 2018

(54) POWER CONTROL FOR PROPELLER-DRIVEN AIRCRAFT

(71) Applicant: Unison Industries, LLC, Jacksonville, FL (US)

(72) Inventors: Mark Wayne McWaters, Jacksonville, FL (US); Scott Richard Nielsen, Franklin, OH (US)

(73) Assignee: Unison Industries LLC, Jacksonville, FL (US)

( * ) Notice: Subject to any disclaimer, the term of this patent is extended or adjusted under 35 U.S.C. 154(b) by 187 days.

(21) Appl. No.: 14/992,465

(22) Filed: Jan. 11, 2016

(65) Prior Publication Data

US 2016/0207633 A1 Jul. 21, 2016

Related U.S. Application Data

(60) Provisional application No. 62/103,748, filed on Jan. 15, 2015.

(51) Int. Cl.
| | | |
|---|---|---|
| *B64D 31/06* | (2006.01) | |
| *B64D 31/04* | (2006.01) | |
| *B64D 43/00* | (2006.01) | |
| *B64D 27/04* | (2006.01) | |
| *B64D 27/10* | (2006.01) | |

(52) U.S. Cl.
CPC ............ *B64D 31/06* (2013.01); *B64D 27/04* (2013.01); *B64D 27/10* (2013.01); *B64D 31/04* (2013.01); *B64D 43/00* (2013.01)

(58) Field of Classification Search
CPC ........ B64D 31/04; B64D 31/06; B64D 43/00; G05D 1/0661; G05D 17/00; G05D 17/02; G05D 13/00; F02D 29/02; F02C 9/28; F02C 9/44; F05D 2270/02; F05D 2270/021; F05D 2270/04; F05D 2270/042; F05D 2270/044; F05D 2270/05; F05D 2270/051; F05D 2270/052; F05D 2270/053; G01L 3/24–3/247; G01D 1/12; G01D 1/18

See application file for complete search history.

(56) References Cited

U.S. PATENT DOCUMENTS

| | | |
|---|---|---|
| 3,916,688 A | 11/1975 | Dendy et al. |
| 4,633,404 A | 12/1986 | Greeson et al. |
| 4,750,127 A | 6/1988 | Leslie et al. |
| 5,031,102 A | 7/1991 | Robbins et al. |
| 5,195,700 A | 3/1993 | Fogler, Jr. et al. |
| 5,299,765 A | 4/1994 | Blechen |
| 5,833,177 A | 11/1998 | Gast |
| 6,340,289 B1 | 6/2002 | Vos et al. |
| 6,450,456 B1 | 9/2002 | Greene |
| 6,748,744 B2 | 6/2004 | Peplow et al. |

(Continued)

OTHER PUBLICATIONS

Canadian Office Action issued in connection with corresponding CA Application No. 2917565 on Jan. 30, 2017.

*Primary Examiner* — Adam R Mott
(74) *Attorney, Agent, or Firm* — Unison Industries LLC; William Andes

(57) ABSTRACT

A method of controlling an engine for a propeller-driven aircraft, including setting an initial maximum power limit, wherein the initial maximum power limit is associated with a maximum allowable thrust for an aircraft, receiving an indication that a predetermined aircraft condition is satisfied, and setting an updated maximum power limit.

20 Claims, 5 Drawing Sheets

(56) References Cited

U.S. PATENT DOCUMENTS

| | | | |
|---|---|---|---|
| 6,808,141 B2 | 10/2004 | Bretscher et al. | |
| 6,819,266 B2 | 11/2004 | Greene | |
| 6,898,491 B2 | 5/2005 | Muller et al. | |
| 7,506,837 B2 | 3/2009 | Parks | |
| 7,512,464 B2 | 3/2009 | Tarleton et al. | |
| 7,931,238 B2 | 4/2011 | Builta et al. | |
| 7,970,501 B2 | 6/2011 | Kirkland et al. | |
| 8,175,763 B2 | 5/2012 | Yamane et al. | |
| 8,265,807 B2 | 9/2012 | Yamane et al. | |
| 8,380,371 B2 | 2/2013 | DeJonge | |
| 8,414,260 B2 | 4/2013 | Johnson | |
| 8,433,449 B2 | 4/2013 | Vas et al. | |
| 8,615,335 B2 | 12/2013 | Couey et al. | |
| 8,655,510 B2 | 2/2014 | Eglin | |
| 8,670,881 B2 | 3/2014 | DeJonge | |
| 2008/0029653 A1* | 2/2008 | Johnson | F02C 9/28 244/175 |
| 2008/0198040 A1* | 8/2008 | Cottet | G01D 7/08 340/971 |
| 2008/0228365 A1* | 9/2008 | White | B60K 28/063 701/70 |
| 2011/0184623 A1 | 7/2011 | De Boer | |

\* cited by examiner

POWER CONTROL FOR PROPELLER-DRIVEN AIRCRAFT

CROSS-REFERENCE TO RELATED APPLICATION

This non-provisional application claims the benefit of priority under 35 U.S.C. § 119(e) to U.S. Provisional Patent Application No. 62/103,748, entitled "POWER CONTROL FOR PROPELLER-DRIVEN AIRCRAFT", filed Jan. 15, 2015, which is herein incorporated in its entirety by reference.

BACKGROUND OF THE INVENTION

Contemporary propeller-driven aircraft have their airframes designed for a variety of conditions including airspeed, weight, thrust, etc. In a conventional propeller-driven aircraft with a flat-rated maximum horsepower, propeller efficiency, and therefore thrust, drops rapidly as airspeed increases.

BRIEF DESCRIPTION OF THE INVENTION

In one aspect, an embodiment of the invention relates to a method of controlling an engine for a propeller-driven aircraft, comprising: setting an initial maximum power limit above which an engine power is automatically reduced, wherein the initial maximum power limit is associated with a maximum allowable thrust for an aircraft, receiving an indication that a predetermined aircraft condition is satisfied and setting an updated maximum power limit above which the engine power is automatically reduced, wherein the updated maximum power limit is greater than the initial maximum power limit.

In another aspect, an embodiment of the invention relates to an engine control system for an aircraft engine comprising a display providing a visual indicia associated with a maximum power limit of the aircraft engine, an aircraft condition input receiving a signal indicative of an aircraft condition related to the maximum power limit, and a controller operably coupled to the aircraft engine, aircraft condition input, and the display and configured to provide an initial maximum power limit signal for the visual indicia on the display, receiving the output from the aircraft condition sensor, processing the received output to determine when an updated maximum power limit is permissible, and providing an updated maximum power limit signal for the visual indicia when an updated maximum power limit is permissible.

In yet another aspect, an embodiment of the invention relates to an aircraft engine comprising a first mode of operation having a first maximum power limit set according to a maximum allowable thrust for a predetermined airframe in a fixed to earth condition and a second mode of operation having a second maximum power limit, greater than the first maximum power limit, which is available during a flight condition wherein during non-flight operation, the power of the aircraft engine is automatically limited to the first maximum power limit.

DESCRIPTION OF EMBODIMENTS OF THE INVENTION

Figure 1:
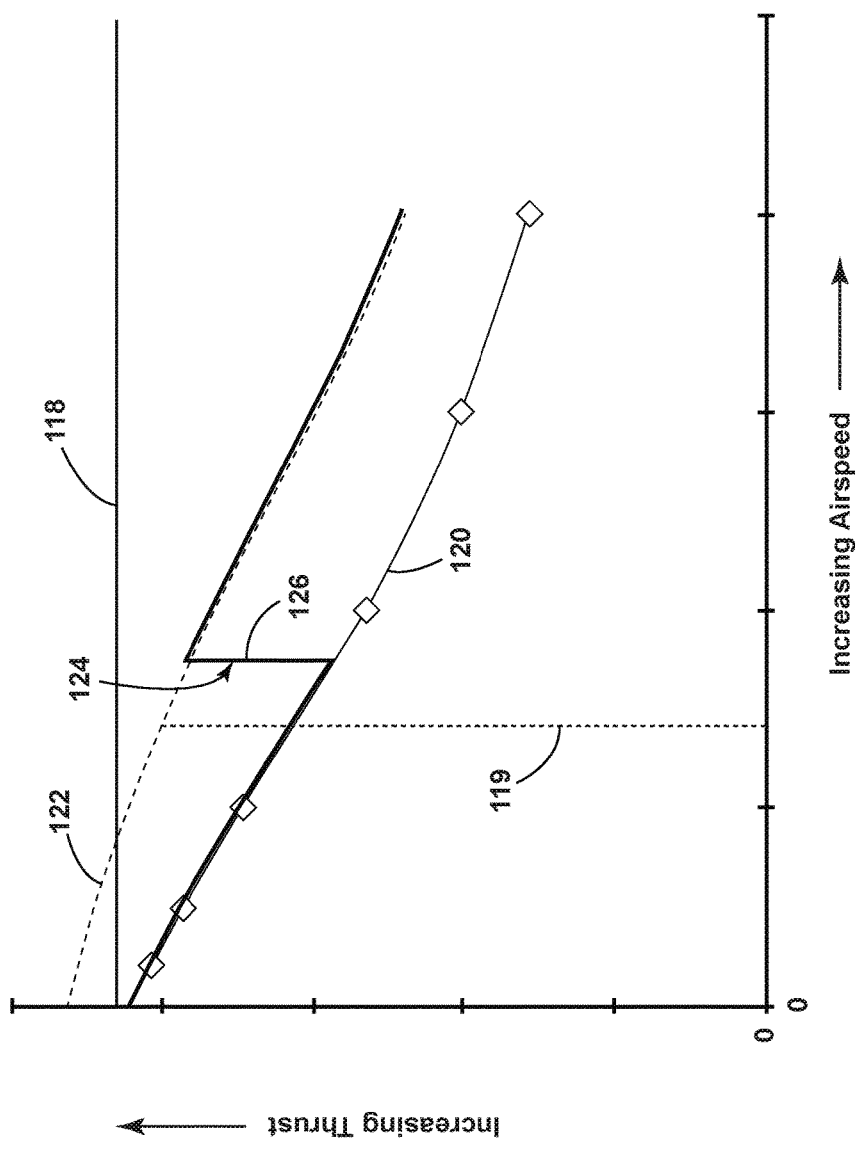
FIG. 1 is an example plot graph illustrating thrust produced by a propeller versus airspeed at a constant propeller speed and at fixed atmospheric conditions.

The present disclosure includes, among other things, aircraft engines, aircraft engine control systems, and methods for controlling aircraft engines, which may be used in connection with propeller-driven aircraft.

The present disclosure contemplates that a propeller-driven aircraft may employ a propeller to produce thrust by pushing air in a direction generally opposite to the direction of flight. An engine may drive the propeller and the thrust produced by the propeller may generally increase as the power supplied by the engine to the propeller increases. Other factors that may influence thrust include propeller design and efficiency, propeller blade pitch, propeller speed, aircraft speed, and prevailing atmospheric conditions. Some aircraft may be designed for operation at or below a maximum available engine thrust, for example due to airframe structural limitations. If such an aircraft is equipped with an engine capable of supplying more power than is used to produce the maximum allowable thrust, the aircraft may be restricted to using only a portion of the engine's power capability, which may be referred to as "de-rating" or "flat-rating." For example, an aircraft may be restricted to operation below a specific supplied power limit.

The present disclosure contemplates that some aircraft may be operated at a supplied power at or below the maximum allowable supplied power throughout the entire operation range of the aircraft. The maximum allowable supplied power is often less than the maximum power capability of the engine.

The present disclosure contemplates that some aircraft may not be configured to directly measure and/or indicate the power supplied to the propeller. Accordingly, some aircraft are operated using other measurements and/or indications, such as the torque applied to drive a propeller. For example, a pilot may operate an aircraft by monitoring a torque indication and controlling an engine to maintain the torque indication at or below a maximum allowable torque corresponding to the maximum allowable supplied power or thrust. Accordingly, it should be understood that references in this disclosure to supplied power, maximum allowable supplied power, power limits, etc., may be implemented and/or indicated using torque or other appropriate parameters in some aircraft.

The present disclosure contemplates that, at a constant power, the thrust produced by a propeller generally decreases as the aircraft's relative speed through the air increases. Thus, for a given supplied power, the thrust produced by the propeller may vary across the different phases of flight. For example, when the aircraft is stationary (e.g., on the ground before takeoff) the thrust produced by the propeller at a given supplied power may be significantly greater the thrust produced by the propeller when the aircraft is flying (e.g., climbing or cruising) at the same supplied power.

The present disclosure contemplates that a fixed maximum allowable supplied power may be an indirect approach to limiting the maximum thrust (force) acting on the airframe. Generally, the maximum allowable supplied power is determined for a test condition in which the airframe is fixed to earth. The maximum allowable supplied power may be the supplied power at which the maximum allowable thrust acting on the airframe is reached in the test condition. Outside of that test condition, the maximum thrust condition generally does not equate to the maximum allowable supplied power. Accordingly, if supplied power is limited to a maximum allowable supplied power, which avoids exceeding the maximum allowable thrust when the aircraft is stationary (the test condition), that maximum allowable supplied power may allow the propeller to produce significantly less thrust than the maximum allowable thrust when the aircraft has appreciable airspeed, such as when the aircraft is flying.

Some example embodiments according to at least some aspects of the present disclosure may provide for adjustment of the maximum allowable supplied power to permit operation at a supplied power higher than the maximum allowable supplied power determined when the aircraft is stationary. Some example embodiments may enable such increased maximum allowable supplied power based at least in part upon indications that the aircraft is in flight and, therefore, is at or above an airspeed that may result in a thrust level less than the maximum allowable thrust.

FIG. 1 is an example plot of the thrust produced by a propeller versus airspeed at a constant propeller speed and at fixed atmospheric conditions. Generally, FIG. 1 illustrates that, at a given supplied power, as air speed increases, the thrust decreases as does the associated propulsive force acting on the airframe. Constant power line 120 illustrates a first example relationship between thrust produced by a propeller and airspeed for first constant power supplied to the propeller by an engine. Maximum allowable thrust line 118 indicates a maximum allowable thrust, which may be determined at least in part based upon airframe structural limitations. The maximum allowable thrust may be substantially constant over a relevant range of airspeeds. In this example, the thrust produced by operating along constant power line 120 is below the maximum allowable thrust indicated by maximum allowable thrust line 118 for all relevant airspeeds. The supplied power corresponding to constant power line 120 may be a maximum allowable supplied power determined based on the supplied power that produces the maximum allowable thrust when the aircraft is stationary (e.g., at zero airspeed). Some aircraft may use the supplied power corresponding to constant power line 120 as a "flat-rated" power limit. The distance in the thrust-axis direction between any point on constant power line 120 and maximum allowable thrust line 118 represents the amount of thrust that is potentially available by increasing the supplied power without exceeding the maximum allowable thrust.

Constant power line 122 illustrates a second example relationship between thrust produced by the propeller and airspeed for a second constant power supplied to the propeller by the engine. The constant supplied power associated with constant power line 122 is greater than the constant supplied power associated with constant power line 120. At some low airspeeds, the thrust produced by operating along constant power line 122 exceeds the maximum allowable thrust (e.g., constant power line 122 is above maximum allowable thrust line 118). At some higher airspeeds, the thrust produced by operating along constant power line 122 is less than the maximum allowable thrust (e.g., constant power line 122 is below maximum allowable thrust line 118).

Line 124 illustrates an example adjustment of the maximum allowable supplied power according to at least some embodiments of the present disclosure, which may permit operation at a supplied power higher than an initial maximum allowable supplied power. In this example, the initial maximum allowable supplied power corresponds to the supplied power associated with constant power line 120. At adjustment 126, the maximum allowable supplied power is adjusted to the supplied power associated with constant power line 122. The thrust-axis length of adjustment 126 corresponds to the increase in available thrust due to the increase in the maximum allowable supplied power. By using at least some of the additional thrust available due to adjustment 126, the aircraft may be able to climb faster and/or reach cruising altitude and/or speed more quickly than if the aircraft was limited to the supplied power associated with constant power line 120.

As further described below, adjustment 126 may be implemented based at least in part upon receiving an indication that a predetermined aircraft condition is satisfied. Such a predetermined aircraft condition may occur at or above a minimum expected airspeed, indicated by a minimum expected airspeed line 119. In some example embodiments, the aircraft condition associated with adjustment 126 and the updated maximum allowable supplied power associated with constant power line 122 may be selected such that operating at the updated maximum allowable supplied power at the minimum expected airspeed for the predetermined condition produces less than the maximum allowable thrust. Graphically, this is illustrated where minimum expected airspeed line 119 intersects constant power line 122 at a thrust level below maximum allowable thrust line 118.

Figure 2:
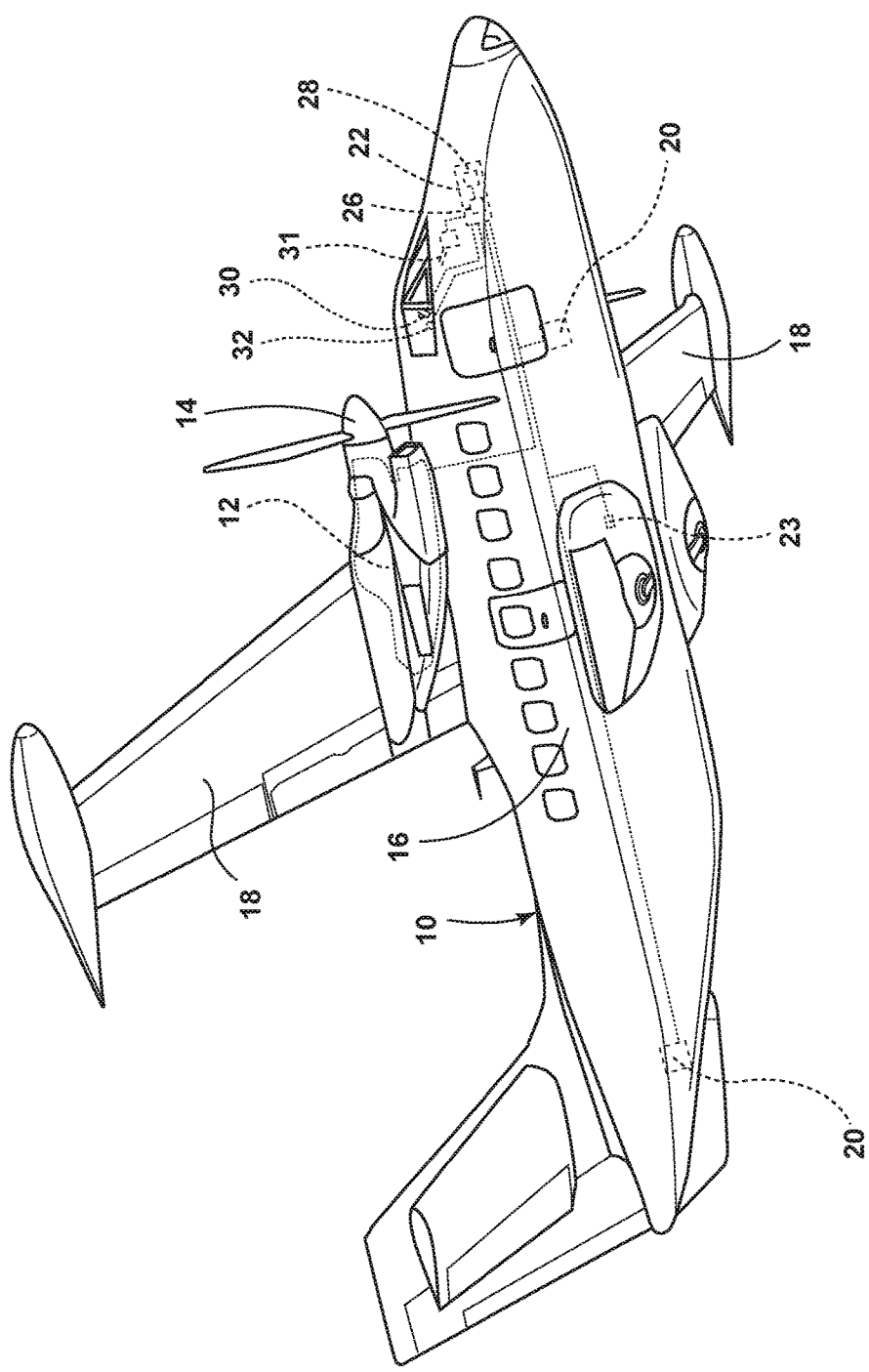
FIG. 2 is an example perspective view of an exemplary aircraft in accordance with various aspects described herein.

FIG. 2 depicts an aircraft 10 that may execute embodiments of the invention and may include a propulsion system, such as a turbo-prop engine 12 and a propeller 14, coupled to a fuselage 16, and wings 18 extending outward from the fuselage 16. While the aircraft 10 has been illustrated as having multiple turbo-prop engines 12, it is contemplated that embodiments of the invention may be utilized with any suitable aircraft having any number of turbo-prop engines 12. Further, it is contemplated that some example embodiments may be implemented in connection with alternative types of engines, such as piston engines.

A plurality of systems 20 that enable proper operation of the aircraft 10 may be included as well as a controller 22. The controller 22 may be operably coupled to the engine 12 and the plurality of aircraft systems 20. The controller 22 may also be connected with any other controllers of the aircraft 10. The controller 22 may include various constituent components, which may be centrally located or distributed at various locations throughout the aircraft. In some example embodiments, the controller 22 may include memory 26, the memory 26 may include random access memory (RAM), read-only memory (ROM), flash memory, or one or more different types of portable electronic memory, such as discs, DVDs, CD-ROMs, etc., or any suitable combination of these types of memory. The controller 22 may include one or more processors 28, which may be running any suitable programs. In some example embodiments, controller 22 may include analog control circuitry. The controller 22 may include and/or interface with an Engine Indicating System (EIS) (or other devices for displaying engine parameters) and/or an Electronic Engine Control (EEC).

In some example embodiments, the controller 22 may include all or a portion of a computer program having an executable instruction set for providing updated maximum allowable supplied power for the aircraft 10. The program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general-purpose computer, special-purpose computer, or special-purpose processing machine to perform a certain function or group of functions.

In some example embodiments, use of an increased maximum allowable supplied power may be enabled through use of a control device 30 located within the cockpit of the aircraft 10. The control device 30 may include any suitable input device, including a switch (e.g., a two position toggle or momentary on/off switch), button, lever, and/or touch-screen display. It is contemplated that actuation of the control device 30 may enable the pilot to increase supplied power above the initial maximum allowable supplied power through use of another control device, such as a power lever 31. Further, one or more indicators 32 may indicate that such increased maximum allowable supplied power functionality is available and/or enabled. Example indicators 32 may include, but are not limited to, lights, gauges, screens and other similar devices, which may be utilized in an aircraft cockpit. In some example embodiments, during operation, the controller 22 may utilize one or more inputs from a pilot (e.g., via control device 30) and/or from one or more sensors 23 to determine whether to provide an updated maximum allowable supplied power, greater than the initial maximum allowable supplied power. In some example embodiments, such pilot and/or sensor inputs may indicate a change in flight condition of the aircraft, for example, that the aircraft has taken off and is in flight.

The sensor inputs utilized by the controller 22 may include any suitable inputs from one or more sensors 23, including any parameter or condition sensed or detected by any aircraft or engine indication, control, or monitoring system. For example, a weight-on-wheels (WONW) (or-weight-off-wheels (WOFW)) sensor may be utilized to determine whether the aircraft's landing gear is supporting the weight of the aircraft. If the WONW or WOFW sensor indicates that the landing gear is not supporting the weight of the aircraft, then it may be assumed that the aircraft is airborne. In some example embodiments, controller 22 may sense that the aircraft 10 is airborne by the use of the WONW or WOFW sensor and allow for updated maximum allowed supplied power functionality.

As another example, in the case where the landing gear is retractable, a signal may be received by the controller 22 that the landing gear has been retracted (e.g., indicating that the aircraft is airborne), and the controller may allow for updated maximum allowable supplied power functionality.

Yet another way to signal the controller 22 is to tie it to a determination that a positive rate of climb has been achieved, upon which the additional power functionality may be enabled. Yet another example would be to use a global positioning system or other navigation system to provide an altitude and/or velocity (e.g., ground speed) indication; once the aircraft is determined to be airborne, the additional power functionality may be enabled. Yet a further example would be to use a radar altimeter indication to ascertain that the aircraft is airborne, upon which the additional power functionality may be enabled.

Figure 3:
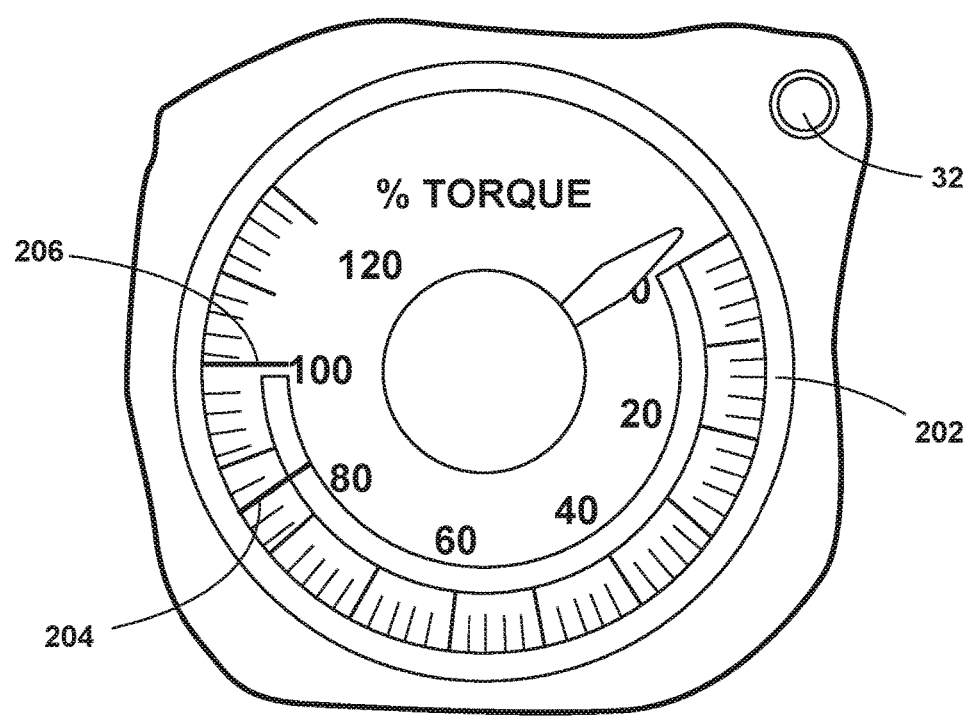
FIG. 3 is an example schematic illustration of a torque gauge in accordance with various aspects described herein.

FIG. 3 is a front elevation view of an example cockpit indication, according to at least some aspects of the present disclosure. Torque gauge 202 may be configured to indicate the torque applied to drive a propeller. Torque gauge 202 may be implemented as a physical gauge, as an electronic representation of a gauge on a display screen, or in any other suitable configuration including any analog or digital representation. A first maximum torque line 204 may indicate an initial maximum allowable torque, which may correspond to a first maximum allowable supplied power, such as may be associated with constant power line 120 of FIG. 1. A second maximum torque line 206 may indicate a second maximum allowable torque, which may correspond to a second maximum allowable supplied power, such as may be associated with constant power line 122 of FIG. 1. Some example embodiments may reference actual torque and/or power values, while other example embodiments may reference torque and/or power as a percentage. In some example embodiments, both first maximum torque line 204 and second maximum torque line 206 may be visible on torque gauge 202.

In some example embodiments, only one of first maximum torque line 204 and second maximum torque line 206 may be visible on torque gauge 202 at any time. For example, only first maximum torque line 204 may be visible initially and/or may be indicated as "100% torque." Then, when increased maximum allowable supplied power functionality is enabled, indicator 32 may be illuminated and/or maximum torque line 204 may be replaced by maximum torque line 206. When only maximum torque line 206 is visible, it may be indicated as "100% torque." Such an embodiment may be referred to as having a moving maximum torque line.

The present disclosure contemplates that some aircraft engine controllers may be configured to automatically reduce or limit fuel flow to the engine if certain conditions are detected, such as if certain parameters exceed or approach predetermined limits. For example, a maximum power limit may be associated with the maximum allowable supplied power discussed above. The engine controller's maximum power limit (e.g., the power level at which the engine controller automatically reduces fuel flow) may be set slightly higher than the maximum allowable supplied power to allow the pilot to operate the aircraft up to the maximum allowable supplied power without the automatic fuel flow reduction or limiting occurring.

Some example embodiments according to at least some aspects of the present disclosure may be configured such that a maximum power limit associated with an automatic reduction or limiting in fuel flow may be changed during operation. In some example embodiments, the maximum power limit may be updated. For example, the controller 22 may be configured to implement both an updated maximum allowable supplied power and an updated maximum power limit when the maximum allowable supplied power is updated. Thus, in some example embodiments, the aircraft may be operated at less than an initial maximum allowable supplied power while an initial maximum power limit is in effect. When an updated maximum allowable supplied power is enabled, an updated maximum power limit may also be implemented.

Figure 4:
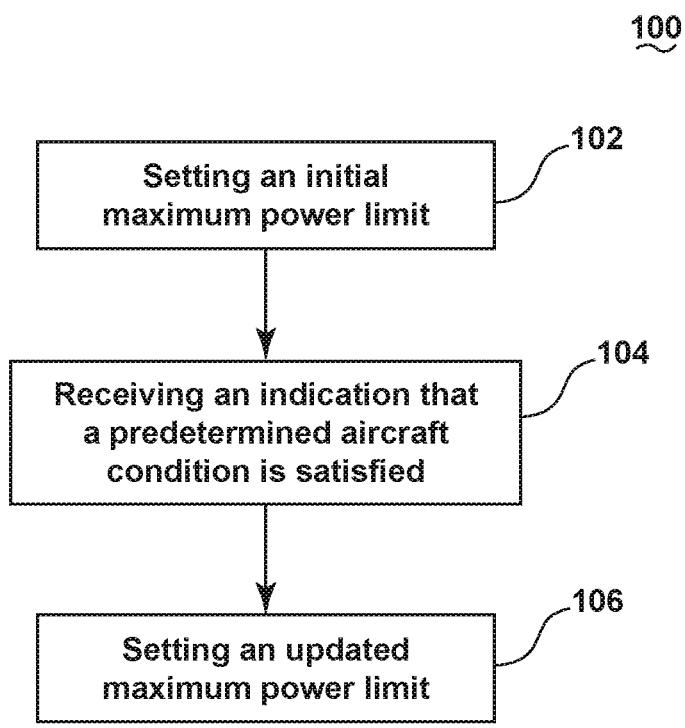
FIG. 4 is an example flow chart of a method of providing an updated maximum horsepower in accordance with various aspects described herein.

In accordance with an embodiment of the invention, FIG. 4 illustrates an example method 100, which may be used for controlling an engine of an aircraft such as the aircraft 10 with the turbo-prop engine 12. At 102, an initial maximum power limit above which an engine power is automatically reduced may be set for the aircraft 10. The initial maximum power limit is associated with a maximum allowable thrust for the aircraft 10. The initial maximum power limit may be set either electrically or mechanically. A mechanical solution may include providing a throttle detent corresponding to the initial maximum power limit set for the turbo-prop engine 12. This may also include providing an indicia associated with the initial maximum power limit setting on a flight deck in the cockpit of the aircraft 10 (e.g., an initial maximum allowable supplied power indication).

At 104, an indication that a predetermined aircraft condition is satisfied may be received by the controller 22. By way of non-limiting example, this may include receiving an indication that is associated with the aircraft being in flight such as when the aircraft is at or above a minimum expected airspeed, such as indicated by minimum expected airspeed line 119. By way of further non-limiting examples receiving the indication that the predetermined aircraft condition is satisfied, may include at least one of the absence of a weight on wheels indication, a weight off wheels indication, a landing gear retracted indication, a positive rate of climb indication, a navigation system velocity indication, a navigation system altitude indication, and a radar altimeter altitude indication. Alternatively, the predetermined aircraft condition may be satisfied at a predetermined thrust. The indication may be received from the controller 22 or a sensor. It will be understood that a sensor input may be received, which is indicative of the predetermined aircraft condition being satisfied. Any suitable sensed operational data may be utilized in determining that the predetermined aircraft condition is satisfied including air speed, altitude, rate of climb, and phase of flight.

At 106 an updated maximum power limit, greater than the initial maximum power limit, may be set based on the received indication at 104. Providing an updated maximum available power limit may include altering the indicia related to the maximum power limit setting on a flight deck in the cockpit of the aircraft 10 (e.g., an updated maximum allowable supplied power indication). By way of non-limiting example, the indicia may include at least one of an indicia on a mechanical gage or an indicia on a flight display.

It will be understood that the method of controlling the maximum power limit is flexible and the method 100 illustrated is merely for illustrative purposes. For example, the sequence of steps depicted is for illustrative purposes only, and is not meant to limit the method 100 in any way, as it is understood that the steps may proceed in a different logical order or additional or intervening steps may be included without detracting from embodiments of the invention. It will be understood that, in some example embodiments, the ability to provide an updated maximum power limit may not always be available. Such a function may be inactive as the aircraft is powered up and as the turbo-prop engine 12 is started. As the aircraft 10 rolls down the runway at some power level, such as takeoff power, the function may be made available. For example, a power lever setting at or above some minimum power setting may be a required element to provide such functionality. As explained above, the updated maximum power limit may be made available due to any number of inputs to the controller 22 including a position of the WONW or WOFW switch, a position of the landing gear switch, or a minimum GPS or radar altitude met. The pilot may then be alerted that the updated maximum power limit is available via an indication, such as an indication light.

Providing an updated maximum allowable supplied power may include the controller 22, automatically increasing a displayed maximum allowable supplied power and/or automatically increasing a maximum power limit associated with at which engine power is automatically reduced. Alternatively, the maximum allowable supplied power and/or maximum power limit may not be adjusted automatically. In such an instance, such limits may be adjusted upon the pilot utilizing the control device 30 to enable the updated maximum allowable supplied power functionality.

In this manner, it will be understood that portions of the flight deck including for example, the torque gauge 202, sensor(s) 23, and controller 22 form an engine control system for the engine 12. More specifically, the torque gauge 202 acts as a display providing a visual indicia associated with a maximum power limit of the aircraft engine. The sensor 23 acts as an aircraft condition sensor providing an output signal indicative of an aircraft condition related to the maximum power limit including when a predetermined aircraft condition is satisfied, which is received at an input of the controller 22. The controller 22 operably couples to the aircraft engine 12, aircraft condition sensor 23, and the display including the torque gauge 202 and the controller 22 is configured to provide an initial maximum power limit signal for the visual indicia on the display, receiving the output from the aircraft condition sensor, processing the received output to determine when an updated maximum power limit is permissible, and providing an updated maximum power limit signal for the visual indicia when an updated maximum power limit is permissible. It will also be understood that the engine itself includes a first mode of operation having a first maximum power limit set according to a maximum allowable thrust for a predetermine airframe in a fixed to earth condition; and a second mode of operation having a second maximum power limit, greater than the first maximum power limit, which is available during a flight condition wherein during non-flight operation, the power of the aircraft engine is automatically limited to the first maximum power limit.

Figure 5:
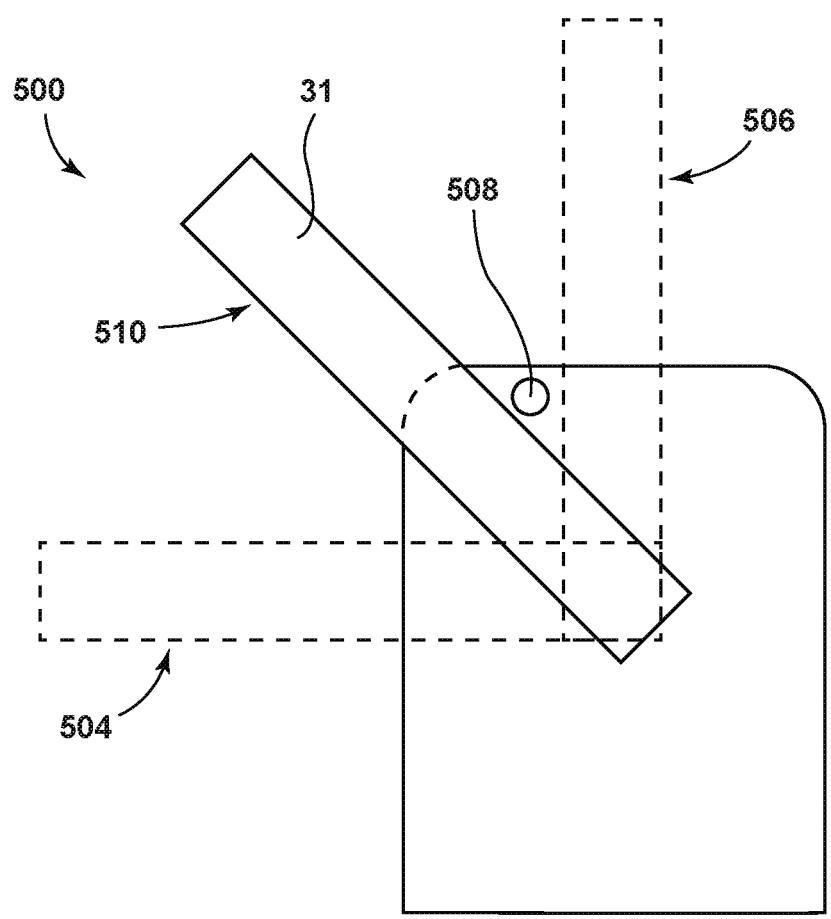
FIG. 5 is a schematic illustration of a power lever apparatus in accordance with various aspects described herein.

Some example embodiments according to at least some aspects of the present disclosure may include a physical stop, which selectively limits the range of power lever motion. FIG. 5 is a side elevation view of an example power lever apparatus 500. Power lever apparatus 500 may include power lever 31, which may be operatively coupled to an engine controller, such as controller 22 (FIG. 2), to allow a pilot to adjust the power supplied to the propeller. Power lever 31 may be movable between a low power position 504 and a high power position 506. A stop 508 may be operatively arranged to limit travel of the power lever 31. For example, when stop 508 is engaged, power lever 31 may be movable between a low power position 504 and an intermediate power position 510. When stop 508 is disengaged, power lever 31 may be movable between low power position 504 and high power position 506, which may command a power greater than the power associated with intermediate power position 510. In an example embodiment, stop 508 may comprise a detent mechanism made able to be retracted allowing further power lever travel to command higher thrust.

Generally, it is contemplated that a pilot may use the updated maximum allowable supplied power as desired. The updated maximum allowable supplied power may be used in any appropriate flight regime including climb and max cruise. Once descent is started, such updated maximum power limit may theoretically not be required.

It is also contemplated that the ability to have an updated maximum power limit could also be a function that is automatically and/or manually disabled. For example, the power lever 31 could be pulled back to reduce power (e.g., to intermediate power position 510) and the pilot could use the control device 30 to disable the updated maximum allowable supplied power functionality. In some example embodiments, the stop 508 may then lock out the power lever 31 from a higher travel range. In some example embodiments, upon pulling back the power lever 31 below a predetermined position (e.g., intermediate power position 510), updated maximum allowable supplied power functionality may be automatically disabled. To re-enable such functionality, the pilot may actuate control device 30. Alternately, if the engine is transitioned into emergency mode and emergency or manual throttle is employed then the updated maximum allowable supplied power may be disabled as a function. Alternately, if the input parameters do not indicate that the aircraft is in flight (or other aircraft condition is satisfied), the updated maximum allowable supplied power may be disabled as a function. In such instances, any indicator that updated maximum allowable supplied power is an option would be turned off.

Some of the above-described embodiments may facilitate fast climb. More specifically, some of the above-described embodiments may allow the use of additional power to improve rate of climb once the aircraft has lifted off, all while staying within the thrust rating of the airframe. Commercially, being able to climb faster to cruising altitude would give certain aircraft a big advantage over aircraft not equipped with this feature. The above-described embodiments may use parameters and operating elements such as weight on or off wheels, altitude, and positive rate of climb to allow use of the additional engine power and associated additional thrust to boost climb rates.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure. For example, while a portion of the disclosure discussed electronically controlled maximum power limit settings, there may be a mechanical solution, like one that manually changes the location of a stop or detent on the throttle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling an engine for a propeller-driven aircraft, comprising:
   setting while the propeller-driven aircraft is stationary on the ground an initial constant power limit, wherein the initial constant power limit is associated with a maximum allowable thrust for the propeller-driven aircraft;
   operating the engine while maintaining the initial constant power limit and while a predetermined aircraft condition is not satisfied;
   receiving an indication that a predetermined aircraft condition has occurred indicating that the propeller-driven aircraft is in flight;
   setting an updated constant power limit above which the engine power is automatically reduced, wherein the updated constant power limit is greater than the initial constant power limit; and
   operating the engine with the updated constant power limit when the propeller-driven aircraft is in flight.

2. The method of claim 1, wherein setting the initial constant power limit includes indicating an initial maximum allowable supplied power in a cockpit of the aircraft, the initial maximum supplied power being associated with the initial constant power limit; and
   wherein setting the updated constant power limit includes indicating an updated maximum allowable supplied power in the cockpit of the aircraft, the updated maximum allowable supplied power being associated with the updated constant power limit.

3. The method of claim 2, wherein the initial maximum allowable supplied power and the updated maximum allowable supplied power are provided as torque indications.

4. The method of claim 1, wherein at least one of the initial constant power limit and the updated constant power limit is implemented using a torque measurement.

5. The method of claim 1, wherein receiving the indication that the predetermined aircraft condition is satisfied includes receiving a position of a weight off wheels switch, receiving a position of a landing gear switch, or receiving an indication that a minimum GPS altitude is met.

6. The method of claim 1, wherein receiving the indication that the predetermined aircraft condition is satisfied includes at least one of an absence of a weight on wheels indication, a weight off wheels indication, a landing gear retracted indication, a positive rate of climb indication, a navigation system velocity indication, a navigation system altitude indication, and a radar altimeter altitude indication.

7. The method of claim 1, wherein receiving the indication that the predetermined aircraft condition is satisfied includes receiving an input associated with actuation of a control device located within a cockpit of the aircraft.

8. The method of claim 1, wherein setting the updated constant power limit comprises disengaging a stop associated with a power lever configured to adjust the engine power;
   wherein, when the stop is engaged, the power lever is movable between a low power position and an intermediate power position, the intermediate power position being associated with the initial constant power limit; and
   wherein, when the stop is disengaged, the power lever is movable between the low power position and a high power position, the high power position being greater than the intermediate power position.

9. An engine control system for an aircraft engine comprising:
- a display providing a visual indicia associated with a power limit of the aircraft engine;
- an aircraft condition input receiving a signal indicative of an aircraft condition related to the power limit; and
- a controller operably coupled to the aircraft engine, aircraft condition input, and the display and configured to provide an initial constant power limit signal set and maintained while an airframe is fixed to the earth for the visual indicia on the display, receiving the signal indicative of the aircraft condition, determining based at least in part on the received signal if the aircraft condition is an airborne aircraft condition, and setting and maintaining an updated constant power limit signal greater than the initial constant power limit signal and associated with the airborne aircraft condition for the visual indicia when an updated power limit is permissible.

10. The engine control system of claim 9, wherein the display is configured to provide an indication associated with the initial power limit and the updated power limit in a cockpit of the aircraft.

11. The engine control system of claim 9, wherein the aircraft condition input receives the signal indicating that a predetermined aircraft condition is satisfied.

12. The engine control system of claim 9, wherein the controller is further configured to disengage a stop associated with a power lever configured to adjust engine power such that when the stop is engaged, the power lever is movable between a low power position and an intermediate power position, the intermediate power position being associated with the initial power limit and when the stop is disengaged, the power lever is movable between the low power position and a high power position, the high power position being greater than the intermediate power position.

13. The engine control system of claim 9, wherein the visual indicia indicates at least one of an allowable supplied power associated with the power limit and an updated allowable supplied power associated with the updated power limit.

14. The engine control system of claim 13, wherein a supplied power limit for the controller is continuously determined and updated in flight and is set higher than an initial maximum allowable supplied power.

15. An aircraft engine system, comprising:
- an aircraft engine for driving a propeller;
- a first mode of operation having a first fixed constant power limit set according to a maximum allowable thrust for a predetermine airframe in a fixed to earth condition; and
- a second mode of operation having a second fixed constant power limit, greater than the first constant power limit, which is available during a flight condition where the aircraft engine is airborne;
- wherein during non-flight operation, the power of the aircraft engine is automatically limited to and maintained at the first power limit.

16. The aircraft engine system of claim 15 wherein the aircraft engine is a turbo-prop engine or a piston engine.

17. The aircraft engine system of claim 15, wherein the flight condition includes at least one of climb or cruise.

18. The aircraft engine system of claim 15, wherein a control device is communicatively coupled to the aircraft engine to engage the second mode of operation.

19. The aircraft engine system of claim 18, wherein the control device includes a power lever.

20. The aircraft engine system of claim 19, wherein the power lever restricts engagement of the second mode of operation based at least in part on the flight condition being achieved.

* * * * *